US012110000B2

(12) United States Patent
Glöckner et al.

(10) Patent No.: US 12,110,000 B2
(45) Date of Patent: Oct. 8, 2024

(54) METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

(71) Applicant: ZF Friedrichshafen AG, Friedrichshafen (DE)

(72) Inventors: Rico Glöckner, Pocking (DE); Migen Bebeti, Munich (DE); Norbert Feuchtner, Untergriesbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 267 days.

(21) Appl. No.: 17/909,764

(22) PCT Filed: Mar. 15, 2021

(86) PCT No.: PCT/EP2021/056505
§ 371 (c)(1),
(2) Date: Sep. 7, 2022

(87) PCT Pub. No.: WO2021/185747
PCT Pub. Date: Sep. 23, 2021

(65) Prior Publication Data
US 2023/0105135 A1  Apr. 6, 2023

(30) Foreign Application Priority Data
Mar. 20, 2020  (DE) ..................... 10 2020 203 594.6

(51) Int. Cl.
*B60W 10/196* (2012.01)
*B60W 10/08* (2006.01)
*B60W 10/18* (2012.01)

(52) U.S. Cl.
CPC .......... *B60W 10/08* (2013.01); *B60W 10/182* (2013.01); *B60W 10/196* (2013.01)

(58) Field of Classification Search
CPC ............... B60W 10/08; B60W 10/182; B60W 10/196
See application file for complete search history.

(56) References Cited

U.S. PATENT DOCUMENTS

2010/0210409 A1  8/2010  Friesen et al.
2015/0321564 A1  11/2015  Huh et al.

FOREIGN PATENT DOCUMENTS

DE  102008024622 A1  11/2009
DE  102015014336 A1  7/2016
(Continued)

*Primary Examiner* — Mathew Franklin Gordon
(74) *Attorney, Agent, or Firm* — LEYDIG, VOIT & MAYER, LTD.

(57) ABSTRACT

A method for operating an electrified drive train, the drivetrain including a driving coupling of an electric motor to at least one wheel of a working machine, the method including generating an acceleration torque by the electric motor, the acceleration torque leading to an increase in speed of the at least one wheel, generating a braking torque, the braking torque leading to a reduction in speed of the at least one wheel, generating a second acceleration torque by the at least one wheel, the second acceleration torque leading to an increase in a speed of the electric motor, and generating a second braking torque by the at least one wheel, the second braking torque leading to a reduction in the speed of the electric motor, wherein, during a regenerative operation of the electric motor, an unwanted acceleration of the working machine is counteracted by an automated additional braking intervention.

13 Claims, 2 Drawing Sheets

(56) References Cited

FOREIGN PATENT DOCUMENTS

| | | | |
|---|---|---|---|
| EP | 0962597 | A2 | 12/1999 |
| EP | 3511190 | A1 | 7/2019 |
| WO | WO 2008128674 | A1 | 10/2008 |

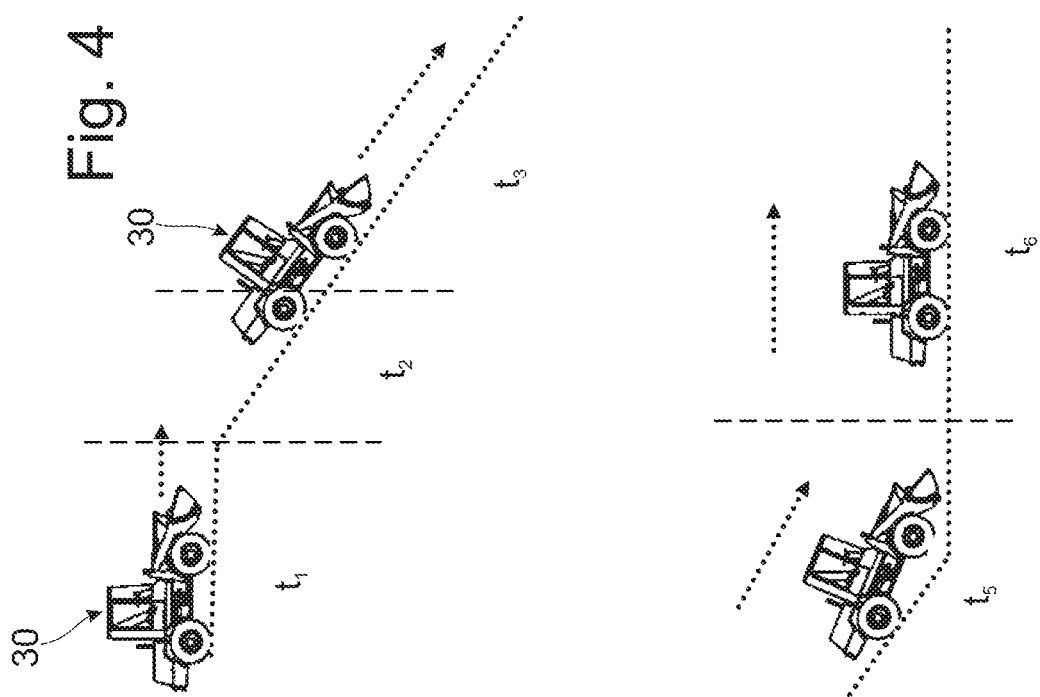
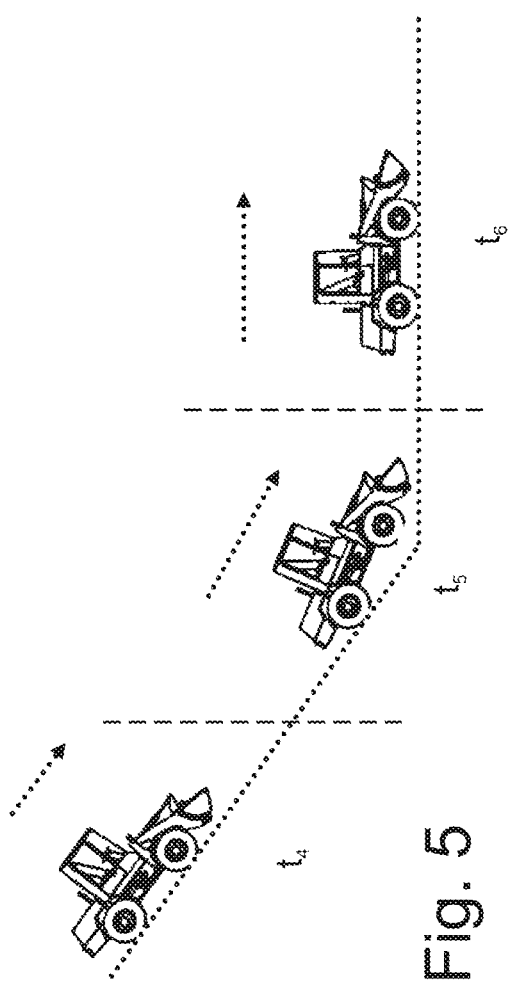
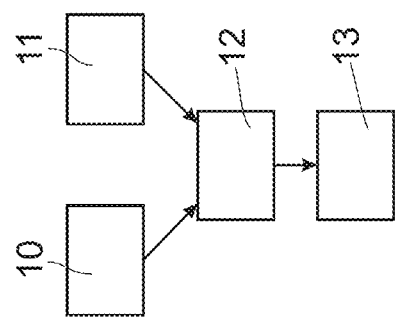

METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

CROSS REFERENCE TO RELATED APPLICATIONS

This application is a U.S. National Phase application under 35 U.S.C. § 371 of International Application No. PCT/EP2021/056505, filed on Mar. 15, 2021, and claims benefit to German Patent Application No. DE 10 2020 203 594.6, filed on Mar. 20, 2020. The International Application was published in German on Sep. 23, 2021 as WO 2021/185747 A1 under PCT Article 21(2).

FIELD

The present invention relates to a method for operating an electrified drive train for a working machine, an electrified drive train for a working machine, and a corresponding working machine.

BACKGROUND

Electrically driven working machines, such as wheel loaders, compact loaders, telescopic loaders, dumpers or diggers are known from the prior art. Such working machines are either purely electrically driven, i.e. they simply have an electric battery or a fuel cell for generating electricity from hydrogen as an energy storage device, or they are diesel-electrically driven, which means that the required energy is provided by a diesel-driven generator and possibly by a back-up electrical storage device, e.g. a correspondingly dimensioned capacitor or a comparatively small battery. In all cases, the mechanical power required for the traction drive and the working drive is generated by one or more electric motors. It is furthermore known to use the electric motors of electric drives to recover electrical power during braking procedures in generator mode. Additionally, a mechanical friction brake is always provided in this case so that sufficient brake power can be always be provided for safety reasons.

In this connection, EP 0962 597 A2 describes a battery-operated working machine which has two electric motors for the traction drive and a further electric motor for the working drive.

WO 2008/128674 A1 discloses a working machine having a hybrid drive train, comprising an internal combustion engine and an electrical machine. To supply energy to the electrical machine, an electrical energy storage device is provided, which can be regeneratively charged by operating the electric motor in generator mode during a braking procedure of the working machine.

A diesel-electrically driven agricultural working machine is furthermore known to the applicant under the name "Rigitrac EWD120", which comprises a diesel-operated generator for providing electrical power and four individual electric wheel drives, which are formed as wheel hub drives and are integrated in the wheel rims. The electrical power generated by the generator is provided for the wheel hub drives.

However, the known electric drive trains for working machines are disadvantageous in that, when travelling downhill at a comparatively high speed, it is often no longer possible to apply a sufficiently high regenerative torque and therefore a sufficiently high braking torque in order to prevent further unwanted acceleration of the working machine into a speed range which is unacceptably high for the working machine as a result of the downhill force. The cause of this insufficient regenerative torque lies in the inherent behavior of an electric motor, which only has a comparatively low torque in its upper speed range and therefore at high driving speeds of the working machine, which in turn also only enables a comparatively low braking or regenerative torque. Such a driving situation requires constant intervention on the part of a driver of the working machine in order to prevent further unwanted acceleration of the working machine when travelling downhill by way of an additional friction brake. On the one hand, this can lead to an overload on the friction brake and, on the other, even to damage of the drive train if the speed of the working machine exceeds a critical speed value.

SUMMARY

In an embodiment, the present disclosure provides a method for operating an electrified drive train for a working machine, wherein the drivetrain comprises a driving coupling of an electric motor of the drive train to at least one wheel of the working machine, the method comprising generating an acceleration torque by the electric motor, the acceleration torque leading to an increase in speed of the at least one wheel, generating a braking torque by the electric motor, the braking torque leading to a reduction in speed of the at least one wheel, generating a second acceleration torque by the at least one wheel, the second acceleration torque leading to an increase in a speed of the electric motor, and generating a second braking torque by the at least one wheel, the second braking torque leading to a reduction in the speed of the electric motor, wherein, during a regenerative operation of the electric motor, an unwanted acceleration of the working machine is counteracted by an automated additional braking intervention.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows, by way of example and schematically, an embodiment of a method for operating an electrified drive train for a working machine in the form of a flow chart, FIG. 4 shows, by way of example and schematically, a working machine during an unwanted acceleration, which is caused as a result of travelling downhill, in successive time periods, and FIG. 5 shows, by way of example and schematically, a working machine during a further unwanted acceleration, which is caused as a result of travelling downhill, in successive time periods.

DETAILED DESCRIPTION

Figure 1:
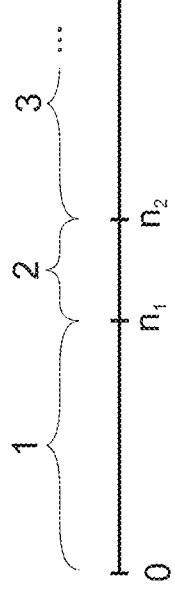
FIG. 1 shows, by way of example and schematically, a speed spectrum of the electric motor of an electrified drive train for a working machine.

In an embodiment, the present invention provides a method for operating an electrified drive train for a working machine. Advantageous configurations and developments of the invention are revealed in the following disclosure.

In an embodiment, the present invention relates to a method for operating an electrified drive train for a working machine, wherein, via a driving coupling of an electric motor of the drive train to at least one wheel of the working machine, an acceleration torque generated by the electric motor leads to an increase in speed of the at least one wheel, a braking torque generated by the electric motor leads to a reduction in speed of the at least one wheel, an acceleration torque generated by the at least one wheel leads to an increase in speed of the electric motor and a braking torque generated by the at least one wheel leads to a reduction in speed of the electric motor.

In an embodiment, an inventive method is notable in that, during a regenerative operation of the electric motor, an unwanted acceleration of the working machine is counteracted by an automated additional braking intervention.

Therefore, according to an embodiment of the invention, a method is provided, which enables the operation of an electrified drive train for a working machine and in a working machine. In this case, an electric motor of the drive train is drivingly coupled to at least one wheel of the working machine, for example via a gear and a releasable clutch, in particular via a multi-plate clutch. As a result of the driving coupling between the electric motor and the at least one wheel, an acceleration torque which is generated by the electric motor leads to an increase in speed of the at least one wheel. In this case, the increase in speed of the at least one wheel corresponds to the increase in speed of the electric motor, taking into account a transmission ratio between the electric motor and the at least one wheel. Analogously, a braking torque generated by the electric motor leads to a reduction in speed of the at least one wheel. Conversely, an acceleration torque of the at least one wheel, which may be caused by the working vehicle travelling downhill, for example, also leads to an increase in speed of the electric motor. A braking torque, which is generated by the at least one wheel and may be caused by the working machine travelling uphill, leads accordingly to a reduction in speed of the electric motor.

According to an embodiment of the invention, it is now provided that an unwanted acceleration of the working machine is firstly identified during a regenerative operation of the electric motor. In this case, an unwanted acceleration is understood to be an acceleration which is not initiated by a driver of the working machine and may occur for example as a result of travelling downhill or as a result of a downhill force acting on the working machine in an accelerating manner. In this case, the unwanted acceleration, like any other acceleration of the working machine for example, can be identified by monitoring and time-differentiating a detected wheel speed, motor speed or other speed in a gear of the working machine. It is likewise conceivable that the acceleration is identified for example via a satellite navigation system. However, the mere fact that acceleration has occurred during the regenerative operation of the electric motor can lead to the conclusion that the acceleration is unwanted, for the reason that the regenerative operation of the electric motor is generally used to decelerate the working machine since the regenerative operation, by its very principle, provides a braking torque. Simultaneously occurring acceleration therefore conflicts with a deceleration which is initiated by the driver of the working machine and which is intended to be brought about by the regenerative operation.

The presence of a regenerative operation is also simultaneously identified. The presence of a regenerative operation can be read out from a control unit of the electric motor in a comparatively simple manner.

Finally, it is provided according to an embodiment of the invention that an additional braking intervention can be implemented in an automated manner, which braking intervention counteracts the unwanted acceleration, i.e. It either reduces or neutralizes or even exceeds the unwanted acceleration of the working machine and therefore leads to a deceleration of the working machine.

To implement the additional braking intervention, two conditions must therefore be fulfilled: firstly, the electric motor must be in regenerative mode and, secondly, an unwanted acceleration must be established—wherein, in particular, any acceleration which occurs in regenerative mode is understood to be an unwanted acceleration. The braking intervention preferably takes place via a mechanical friction brake, which is advantageously hydraulically or electrically actuable. A friction brake is generally more powerful in terms of its braking effect than a regenerative electric motor and, in particular, the braking effect of the friction brake is not speed-dependent—unlike that of the regenerative electric motor.

In an embodiment, the method therefore results in the advantage that an unwanted acceleration of the working machine in the regenerative mode of the electric motor, along with the associated risks, can be prevented in an automated manner. Too high a speed of the working machine can represent a risk in terms of the driving stability of the working machine and a risk in terms of possible damage or destruction of the drive train as a result of too high speeds. In particular, manual intervention by a driver of the working machine, for example by actuating a hydraulic friction brake of the working machine, is unnecessary. In an embodiment, the invention therefore solves the problem, present in the prior art, of an electric motor in regenerative mode providing an ever decreasing braking torque at increasingly high speeds, i.e. in the event of an acceleration, so that, without the inventive method, the speed of the working machine would continue to increase as a result of the unwanted acceleration. A typical application situation is, for example, when the working machine is travelling downhill and the driver of the working machine wishes to counteract an acceleration—which acts on the working machine as a result of the downhill force—by means of a braking torque which is generated by the electric motor in regenerative mode. However, depending on the speed of the electric motor, it may be that—in contrast to a friction brake—the electric motor in regenerative mode can no longer provide an adequate braking torque. It is possible to overcome this disadvantage via the additional braking intervention provided according to embodiments of the invention, in particular by means of a friction brake.

According to an embodiment of the invention, it is provided that the additional braking intervention compensates the unwanted acceleration precisely. In this case, the unwanted acceleration is therefore neutralized by the additional braking intervention and an uncertain situation for the driver of the working machine as a result of the unwanted acceleration is prevented from occurring. Instead, the working machine behaves solely according to the control inputs of the driver. In this case, the additional braking intervention continues until an unwanted acceleration no longer needs to be compensated, i.e. an unwanted acceleration force no longer acts on the working machine.

For exact compensation of the unwanted acceleration, it may be advantageous to determine the value of the unwanted acceleration. This can be achieved for example from a differentiation of the driving speed of the working machine over time or from the analysis of environmental conditions, such as a slope, for example, which leads to unwanted acceleration. With reference to a known or particular slope, which can be detected for example by inclination sensors or read out from a digital map, it is possible to calculate the downhill force and thus in turn the acceleration resulting from the downhill force.

According to an embodiment of the invention, it is provided that the additional braking intervention reduces a driving speed of the working machine to the extent that, as a result of the regenerative operation alone, an unwanted acceleration no longer occurs. In this case, as a result of the automated additional braking intervention, the driving speed of the working machine is therefore reduced in an automated manner to the extent that the brake power which can be provided as a result of the regenerative operation is itself capable of preventing a further unwanted acceleration of the working machine, i.e. without an additional braking intervention.

Since the brake power of the electric motor which can be provided in regenerative mode is essentially influenced by the speed of the electric motor, wherein the brake power is comparatively high at low speeds and comparatively low towards higher speeds, the additional braking intervention has to reduce the driving speed of the working machine depending on the value of the unwanted acceleration to the extent that the electric motor is in a speed range in which it can provide an adequate braking torque as a result of the regenerative process. This can also lead to a reduction in the driving speed of the working machine so that it is below the speed at which the working machine was traveling before the unwanted acceleration occurred. The additional braking intervention advantageously only takes place until the driving speed of the working machine or the speed of the electric motor has been sufficiently reduced.

According to an embodiment of the invention, it is provided that the additional braking intervention is only implemented if the driving speed of the working machine has exceeded a speed threshold value. In other words, the unwanted acceleration is therefore not counteracted by an automated additional braking intervention if the driving speed of the working machine does not exceed the speed threshold value. Regardless of this, the driver of the working machine naturally still has the option of carrying out a manual braking intervention in order to prevent an unwanted acceleration. In this case, the speed threshold value advantageously separates a permissible driving speed range from an impermissible driving speed range of the working machine. In the impermissible driving speed range, it may be that the working machine can no longer be reliably controlled, in particular on uneven or slippery ground or when cornering, and an accident is more likely to occur. Likewise, damage to the drive train may also occur in the impermissible driving speed range as a result of the high speeds of the electric motor and the gear.

By means of the comparison means provided for this purpose, which may be designed as an electronic computer unit and a software algorithm which can be executed on the computer unit, the detected speed of the working machine can be compared with the speed threshold value. If the detected speed of the working machine is less than or equal to the speed threshold value, it may be assumed that the working machine is not in a safety-critical state and an automated braking intervention is not required.

The speed threshold value is preferably set such that a driving speed of the working machine is still in the upper range of the permissible driving speed of the working machine.

It is preferably provided that the speed threshold value is 10%, 15% or 20% lower than the permissible maximum speed of the working machine. This also creates corresponding safety reserves in the power spectrum of the electric motor, i.e. in the braking torque which can be provided as a result of the regenerative operation of the electric motor, so that an unwanted acceleration of the working machine can also be reliably prevented in particular when travelling downhill at a correspondingly steep incline, i.e. with a correspondingly high downhill force, which acts on the machine in an accelerating manner.

According to an embodiment of the invention, it is provided that the unwanted acceleration is identified by simultaneously monitoring a setting of a device for specifying the speed of the electric motor and a driving speed of the working machine and establishing their relationship. In this case, the device for specifying the speed can be any control or regulating device for specifying the speed of the electric motor, e.g. a gas pedal, a lever or a rotary controller. An unwanted acceleration can therefore be identified simply by comparing information which is available in the working machine in any case, without additional sensors. An unwanted acceleration is identified, for example, if the speed of the working machine increases, which can be identified in particular on the basis of a change in the wheel speed, a change in the motor speed or a change in the gear speed, without a change in the setting of the device for specifying the speed of the electric motor, i.e. it is clear that the driver of the working machine does not wish for acceleration to take place. An unwanted acceleration can likewise also be identified if the setting of the device for specifying the speed of the electric motor is actually canceled but the speed of the working machine still increases.

In an embodiment, the invention moreover relates to an electrified drive train for a working machine, comprising an electric motor and at least one drive wheel, wherein the electric motor and the at least one drive wheel are drivingly coupled so that an acceleration torque generated by the electric motor leads to an increase in speed of the at least one wheel, a braking torque generated by the electric motor leads to a reduction in speed of the at least one wheel, an acceleration torque generated by the at least one wheel leads to an increase in speed of the electric motor and a braking torque generated by the at least one wheel leads to a reduction in speed of the electric motor.

In an embodiment, the inventive electrified drive train is notable in that the drive train comprises means for identifying an unwanted acceleration of the working machine during a regenerative operation of the electric motor and in that the drive train furthermore comprises means for carrying out an automated additional braking intervention.

As a result, the advantages which have already been described in connection with the inventive methods also apply to the inventive drive trains.

According to an embodiment of the invention, it is provided that the drive train furthermore comprises means for identifying a gradient of an incline, wherein the means for identifying a gradient of an incline are designed as an inclination sensor. As a result of the means for identifying a gradient of an incline, it is advantageously possible to identify whether the working machine is moving in an environment which can bring about a downhill force on the working machine and therefore lead to an unwanted acceleration. In this case, an inclination sensor can be arranged with a specified alignment and inclination in a likewise specified position in the working machine or on the working machine. An inclination of the working machine, for example as a result of an incline, therefore leads to a corresponding inclination of the inclination sensor. The inclination sensor detects this inclination and recognizes that the working machine is located on an incline. On the basis of the known alignment of the inclination sensor in the working machine or on the working machine, the inclination sensor moreover identifies whether the working machine is located sideways, in the direction of travel or contrary to the direction of travel on the incline. The inclination sensor can be designed for example as a two-axle inclination sensor, which identifies inclinations both in the longitudinal direction and in the lateral direction of the working machine. Likewise, two or three single-axis inclination sensors in each case can also be arranged orthogonally to one another in the working machine or on the working machine.

According to an embodiment of the invention, it is provided that the means for identifying an incline are designed as a satellite navigation system. The satellite navigation system can be for example GPS, Galileo or Glonass. The satellite navigation system furthermore comprises a digital memory in which digital map data are stored. These digital map data advantageously comprise topographical data, i.e. elevation information and changes in elevation. Therefore, an incline can be identified with the aid of the satellite navigation system, namely by determining a current position of the working machine and reading out the topographical map data in the established position of the working machine.

According to an embodiment of the invention, it is provided that the means for identifying an incline are designed as fill level sensors of fluid containers of the working machine. Suitable fluid containers of the working machine can be for instance a possibly provided fuel tank, a cooling water tank, a screen-wash tank or an expansion tank for hydraulic fluid of a working drive of the working machine. Depending on their specific arrangement in the fluid containers of the working machine, the fill level sensors can thus identify an inclination of the working machine and, on the basis of the identified inclination of the working machine, it is in turn possible to identify whether the working machine is located on an incline. For example, it is possible that a fill level sensor in the cooling water container, which detects the cooling water fill level, detects an apparent increase in the cooling water level in the event of an inclination of the working machine in the frontal direction, which corresponds to the working machine travelling downhill. Conversely, this fill level sensor would detect a sudden apparent decrease in the cooling water level when the working machine is travelling uphill.

It is preferably provided that the means for identifying an incline equally comprise a plurality of the embodiments mentioned above. This advantageously enables mutual plausibility checking of the detected information and therefore validation that an incline has been identified or that the working machine is travelling downhill. Faulty implementation of the inventive method when the working machine is not actually travelling downhill is therefore almost impossible.

It is preferably provided that the drive train furthermore comprises means for detecting a movement of the working machine, wherein the means for detecting a movement of the working machine are designed as wheel speed sensors and/or as a satellite navigation system and/or as an acceleration sensor and/or as means for detecting a speed of the electric motor. The wheel speed sensors are preferably so-called ABS sensors. The ABS sensors enable reliable identification of the wheel speed, wherein a corresponding movement of the working machine can always be inferred from the presence of a wheel speed. The satellite navigation system can in turn be designed on a GPS basis, a Galileo basis or a Glonass basis. Since such a satellite navigation system continuously determines a current position of the working machine, a movement of the working machine can always be inferred from a change in position of the working machine. As acceleration sensors, it is possible to use the acceleration sensors which are usually included in a conventional ESP system. A current driving speed of the working machine can in turn be identified from an acceleration which is detected by the acceleration sensors and a time duration of the acceleration. The means for detecting a speed of the electric motor can be designed for example as a conventional speed sensor, which detects a speed of the motor shaft or a drive pinion which is arranged on the motor shaft. The motor speed which is detected in such a way can then be converted into a speed of the working machine via a known transmission ratio and the known rolling circumference of the wheels, in particular by means of an electronic computer unit which is designed for this purpose. If the working machine has a driving speed, it can be inferred that the working machine is moving.

It is preferably provided that the drive train furthermore comprises means for detecting a wheel speed, wherein the means for detecting a wheel speed are designed as ABS sensors. ABS sensors are always required in the working machine due to legal stipulations regarding safety considerations. Moreover, as a result of their high-volume production, ABS sensors are comparatively cost-effective, technically sophisticated and reliable. ABS sensors enable reliable detection of the wheel speeds associated therewith at any time.

It is preferably provided that the drive train furthermore comprises means for detecting a motor speed, wherein the means for detecting a motor speed are designed as a speed sensor on the motor and/or as calculating means for calculating the motor speed. The speed sensor can be arranged directly on a motor shaft, for example, and can therefore detect the speed of the motor shaft, or the speed sensor can be arranged on the housing of the electric motor and detect a speed of the rotor of the electric motor, for example. The calculating means for calculating the motor speed can comprise a current sensor and a voltage sensor, for example, wherein the current sensor detects a current supply to the electric motor and the voltage sensor detects a voltage supply of the electric motor. The calculating means for calculating the motor speed can furthermore detect an electronic calculation path, which calculates the motor speed from the detected voltage and the detected current, in particular taking into account a motor load, i.e. taking into account a torque which is to be applied by the electric motor. In both cases, the motor speed of the electric motor can be determined in a simple and reliable manner.

According to an embodiment of the invention, it is provided that the means for carrying out an automated braking invention comprise a friction brake. The friction brake can be mechanically, hydraulically or electrically actuable, for example.

According an embodiment of the invention, it is provided that the friction brake is designed as a negative parking brake, as a spring-loaded and hydraulically releasable brake or as an eddy-current brake. These embodiments of friction brakes have proven suitable for carrying out the automated additional braking intervention. Moreover, these embodiments of friction brakes are advantageous in that they can be actuated in a simple automated manner.

According to an embodiment of the invention, it is provided that the drive train is designed to implement the inventive method. The drive train has all the necessary devices and means for this purpose.

Embodiments of the invention finally also relate to a working machine, comprising an inventive drive train. As a result, the advantages which have already been described in connection with the inventive drive train also apply to the inventive working machine.

The working machine is preferably a wheel loader. However, it can also be a compact loader, telescopic loader, dumper, digger or tractor.

The same objects, functional units and comparable components are denoted by the same reference signs across the figures. These objects, functional units and comparable components are designed to be identical in terms of their technical features, unless explicitly or implicitly stated otherwise in the description.

FIG. 1 shows, by way of example and schematically, a speed spectrum of an electric motor of an electrified drive train for a working machine 30. In this case, the speeds n of the electric motor correspond to the wheel speeds of wheels of the working machine—according to a transmission ratio of a gear of the working machine—and are therefore a measure of the driving speed of the working machine 30. Likewise, a change in the speeds n of the electric motor also corresponds to a change in the driving speed of the working machine 30, i.e. an acceleration or a deceleration of the working machine 30. By way of example, in the speed range 1 of 0 to $n_1$, the electric motor is substantially at full power. This speed range 1 also corresponds to the permissible maximum speed of the working machine 30—according to the transmission ratio of the gear of the working machine 30. The electric motor has been configured and designed for the speed range 1. In the speed range 2 of $n_1$ to $n_2$, the electric motor is already operated in the technically feasible maximum speed range in which damage to the drive train does not yet occur. In this speed range, the electric motor already exhibits significant power losses, i.e. its drive power and its regenerative power are significantly reduced. Although the drive train is not yet subject to damage in the speed range 2, the working machine 30 is not designed for such high driving speeds. It can no longer be reliably controlled in the speed range 2 and it is relatively easy for an accident to occur. As a result of a further unwanted acceleration, for example as a result of the working machine 30 travelling downhill, the speed n of the electric motor can increase beyond the speed $n_2$ so that it is in the speed range 3. In the speed range 3, in addition to a high risk of the working machine 30 being involved in an accident, there is also the acute risk of damage or destruction of the drive train. Therefore, a driver of the working machine 30 will usually switch the electric motor to regenerative mode at the latest whilst in the speed range 2, but generally whilst still in the speed range 1, in order to prevent a further increase in the driving speed or the speed n of the electric motor by means of the regenerative torque of the electric motor, which acts as a braking torque. If an unwanted acceleration of the working machine 30 is still identified during the regenerative operation of the electric motor, for example as a result of the working machine 30 travelling downhill, the unwanted acceleration is counteracted according to the invention by an automated additional braking intervention. It is therefore possible to avoid damage or destruction of the drive train and also prevent the working machine 30 from reaching an impermissibly high driving speed.

Figure 2:
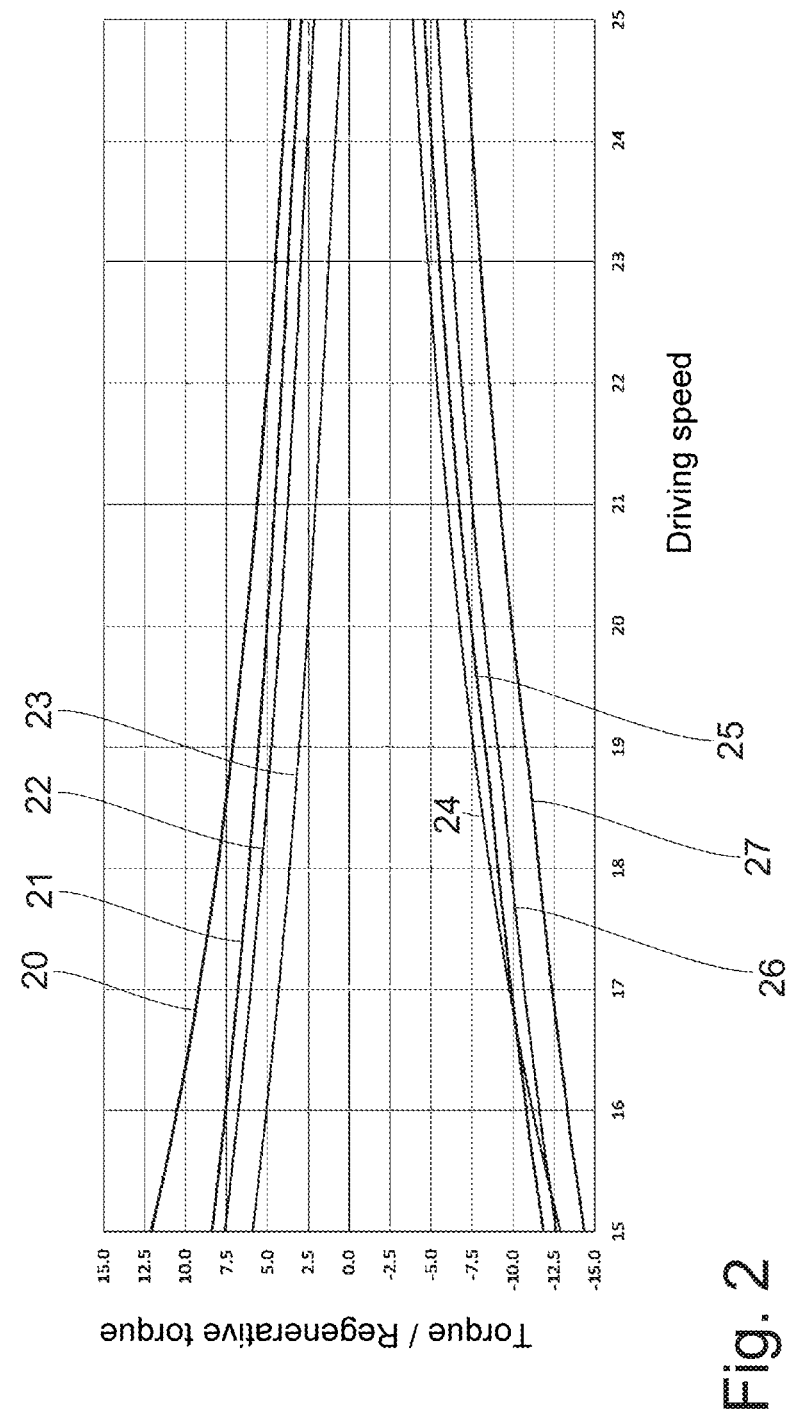
FIG. 2 shows, by way of example and schematically, torque curves and regenerative torque curves of the electric motor of an electrified drive train for a working machine.

FIG. 2 shows, by way of example and schematically, torque curves 20, 21, 22, 23 of the electric motor depending on a speed n of the electric motor or a driving speed of the working machine for different rolling friction resistances. In this case, the driving speed of the working machine 30 is illustrated by way of example on the x-axis and the torque or regenerative torque which can be provided is illustrated on the y-axis. The rolling friction resistances increase from the torque curve 20, which is subject to the least rolling friction resistance, to the torque curve 23, which is subject to the greatest rolling friction resistance. As can be seen, the torque which can be provided decreases continuously with the increasing driving speed of the working machine 30 and therefore with the increasing speed n of the electric motor. Despite the increasing speed n, this decrease in the torque leads to an overall reduction in the drive power which can be provided and is a typical behavior for electric motors. The regenerative torque curves 24, 25, 26, 27 can furthermore be seen in FIG. 2, likewise depending on a speed n of the electric motor or a driving speed of the working machine 30 for different rolling friction resistances. The rolling friction resistances here increase from the regenerative torque curve 24, which is subject to the least rolling friction resistance, to the regenerative torque curve 27, which is subject to the greatest rolling friction resistance. As can be seen, the regenerative torque which can be provided decreases continuously with the increasing driving speed of the working machine 30 and therefore with the increasing speed n of the electric motor. Despite the increasing speed n, the decrease in the regenerative torque also leads to an overall reduction in the regenerative power which can be provided and, in the same measure, brings about a reduction in the brake power which can be provided in the regenerative mode, so that the brake power which can be provided in the regenerative mode continues to decrease with the increasing driving speeds of the working machine 30 or with the increasing speeds n of the electric motor.

FIG. 3 shows, by way of example and schematically, a possible embodiment of the inventive method in the form of a flow chart. The inventive method is implemented in an electrified drive train for a working machine 30. In a first method step 10, a readout from a control unit of the electric motor indicates whether the electric motor is in regenerative mode. At the same time, in step 11, a speed of the electric motor is detected by means for detecting a speed n of the electric motor and differentiated over time so that an acceleration can be identified. If the electric motor is not in the regenerative mode or an acceleration is not identified, the method is implemented again in steps 10 and 11. However, if the electric motor is in regenerative mode and an acceleration is identified at the same time, an unwanted acceleration is identified in step 12 since the regenerative mode is generally used to decelerate the working machine 30 and a simultaneously occurring acceleration therefore appears to contradict the driver's wish for deceleration to take place. An automated additional braking intervention now takes place in step 13 by means of a friction brake, which counteracts the unwanted acceleration of the working machine 30. By way of example, this braking intervention is controlled in a precise manner so that it counteracts the unwanted acceleration precisely, i.e. it neutralizes it.

According to an exemplary embodiment of the invention, which is likewise illustrated in FIG. 3, the braking intervention in step 13 takes place by way of example in such a way that the additional braking intervention reduces the driving speed of the working machine 30 to the extent that, as a result of the regenerative operation of the electric motor alone, an unwanted acceleration now no longer occurs.

FIG. 4 shows, by way of example and schematically, a working machine 30 during an unwanted acceleration, which is caused as a result of travelling downhill, in successive time periods $t_1$, $t_2$, $t_3$. The arrows show the movement direction of the working machine 30. In the earliest time period $t_1$, the working machine 30 is located on a level surface and has, by way of example, a constant driving speed of 20 km/h. As it enters the time period $t_2$, the working machine 30 is travelling downhill and experiences an unwanted acceleration as a result of the active downhill force. In this case, the unwanted acceleration is detected by way of example by simultaneously monitoring a setting of the gas pedal and a driving speed of the working machine 30 and establishing their relationship. In this case, it is identified that the driving speed is increasing although the setting of the gas pedal has actually been canceled and the electric motor has been switched to regenerative mode. It is thus concluded that an unwanted acceleration is taking place. By way of example, the unwanted acceleration leads to an increase in the driving speed to 23 km/h. To counteract the unwanted acceleration, an additional braking intervention is implemented in an automated manner in the time period $t_3$. At the same time, the extent of the unwanted acceleration is determined along with the value of the regenerative torque which needs to be applied accordingly to completely neutralize the unwanted acceleration. Since the regenerative torque which can be applied decreases with the increasing speed n of the electric motor, it is established that the required regenerative torque can only be applied when the driving speed is reduced to 15 km/h. The additional braking intervention therefore takes place for example to the extent that a driving speed is reduced to 15 km/h so that, as a result of the regenerative operation alone, an unwanted acceleration now no longer occurs.

FIG. 5 shows, by way of example and schematically, a working machine 30 during a further acceleration, which is caused as a result of travelling downhill, in successive time periods $t_4$, $t_5$, $t_6$. The arrows again show the movement direction of the working machine 30. In the time period $t_4$, the electric motor, as a result of implementing the inventive method, applies a sufficiently high regenerative torque to prevent an unwanted acceleration of the working machine 30 as a result of travelling downhill. In the time period $t_5$, it is established by means of an inclination sensor that the inclination is decreasing and transitioning into a level surface. The regenerative power of the electric motor is therefore reduced, i.e. the regenerative torque of the electric motor is reduced, so that the working machine 30 accelerates again as a result of the downhill force. However, this is not an unwanted acceleration but, on the contrary, a wanted acceleration, so that the working machine 30, in the time period $t_6$, again reaches the driving speed of 20 km/h which is possible on the level surface without the need to apply drive power of the electric motor for this purpose.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 1, 2, 3 Speed range
10 Identifying whether the electric motor is in regenerative mode
11 Detecting a speed of the electric motor
12 Identifying an unwanted acceleration
13 Carrying out an automated additional braking intervention
20, 21, 22, 23 Torque curve
24, 25, 26, 27 Regenerative torque curve
30 Working machine
$n_1$, $n_2$, $n_3$ Speed
$t_1$, $t_2$, $t_3$, $t_4$, $t_5$, $t_6$ Time period

The invention claimed is:

1. A method for operating an electrified drive train for a working machine, wherein the drivetrain comprises a driving coupling of an electric motor of the drive train to at least one wheel of the working machine, the method comprising:
   generating an acceleration torque by the electric motor, the acceleration torque leading to an increase in speed of the at least one wheel;
   generating a braking torque by the electric motor, the braking torque leading to a reduction in speed of the at least one wheel;
   generating a second acceleration torque by the at least one wheel, the second acceleration torque leading to an increase in a speed of the electric motor; and
   generating a second braking torque by the at least one wheel, the second braking torque leading to a reduction in the speed of the electric motor,
   wherein, during a regenerative operation of the electric motor, an unwanted acceleration of the working machine is counteracted by an automated additional braking intervention.

2. The method as claimed in claim 1,
   wherein the additional braking intervention compensates the unwanted acceleration precisely.

3. The method as claimed in claim 1,
wherein the additional braking intervention reduces a driving speed of the working machine to the extent that, as a result of the regenerative operation alone, an unwanted acceleration no longer occurs.

4. The method as claimed in claim 3, wherein the additional braking intervention is only implemented if the driving speed of the working machine has exceeded a speed threshold value.

5. The method as claimed in claim 1,
wherein the unwanted acceleration is identified by simultaneously monitoring a setting device for specifying the speed of the electric motor and a driving speed of the working machine and establishing their relationship.

6. An electrified drive train for a working machine, comprising:
an electric motor; and
at least one drive wheel, wherein the electric motor and the at least one drive wheel are drivingly coupled such that:
an acceleration torque generated by the electric motor leads to an increase in speed of the at least one wheel,
a braking torque generated by the electric motor leads to a reduction in speed of the at least one wheel,
an acceleration torque generated by the at least one wheel leads to an increase in speed of the electric motor and
a braking torque generated by the at least one wheel leads to a reduction in speed of the electric motor,
wherein the drive train is configured to identify an unwanted acceleration of the working machine during a regenerative operation of the electric motor, and
wherein the drive train is further configured to carry out an automated additional braking intervention.

7. The drive train as claimed in claim 6,
wherein the drive train further comprises an inclination sensor configured to identify a gradient of an incline.

8. The drive train as claimed in claim 6,
wherein the drive train further comprises a satellite navigation system configured to identify an incline.

9. The drive train as claimed in claim 6,
wherein the drive train further comprises fill-level sensors of fluid containers of the working machine configured to identify an incline.

10. The drive train as claimed in claim 6,
wherein the drive train comprises a friction brake configured to carry out the automated additional braking intervention.

11. The drive train as claimed in claim 10,
wherein the friction brake is configured as a negative parking brake, as a spring-loaded and hydraulically releasable brake or as an eddy-current brake.

12. The drive train as claimed in claim 6, wherein the drive train is configured to implement a method for operating an electrified drive train for a working machine, the method comprising:
generating an acceleration torque by the electric motor, the acceleration torque leading to an increase in speed of the at least one wheel;
generating a braking torque by the electric motor, the braking torque leading to a reduction in speed of the at least one wheel;
generating a second acceleration torque by the at least one wheel, the second acceleration torque leading to an increase in a speed of the electric motor; and
generating a second braking torque by the at least one wheel, the second braking torque leading to a reduction in the speed of the electric motor,
wherein, during a regenerative operation of the electric motor, an unwanted acceleration of the working machine is counteracted by an automated additional braking intervention.

13. A working machine comprising a drive train as claimed in claim 6.

* * * * *